US009416935B2

(12) United States Patent
Watanabe et al.

(10) Patent No.: US 9,416,935 B2
(45) Date of Patent: Aug. 16, 2016

(54) VEHICLE DIRECTION INDICATOR LIGHT HAVING A LIGHT EMITTING BODY INCLUDING AN OUTER EMITTING SURFACE, AN INNER EMITTING SURFACE, A TIP SURFACE, AND A LIGHT GUIDE BODY

(71) Applicant: HONDA MOTOR CO., LTD., Tokyo (JP)

(72) Inventors: Hidefumi Watanabe, Utsunomiya (JP); Tomohiko Sano, Utsunomiya (JP); Koji Fukura, Utsunomiya (JP); Masayuki Takayama, Utsunomiya (JP); Shuji Koman, Tokyo (JP); Hiroshi Ishibashi, Tokyo (JP); Shigeru Watanuki, Tokyo (JP); Masahiro Sagawa, Asaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 123 days.

(21) Appl. No.: 14/230,184

(22) Filed: Mar. 31, 2014

(65) Prior Publication Data

US 2014/0301099 A1      Oct. 9, 2014

(30) Foreign Application Priority Data

Apr. 5, 2013   (JP) .................. 2013-079762

(51) Int. Cl.
| F21S 8/10 | (2006.01) |
| B60Q 1/00 | (2006.01) |
| B60Q 1/26 | (2006.01) |
| B60Q 1/38 | (2006.01) |

(52) U.S. Cl.
CPC ........... *F21S 48/2225* (2013.01); *B60Q 1/0041* (2013.01); *B60Q 1/2607* (2013.01); *B60Q 1/38* (2013.01); *F21S 48/215* (2013.01); *F21S 48/2212* (2013.01); *F21S 48/2243* (2013.01);

(Continued)

(58) Field of Classification Search
CPC . F21S 48/2225; F21S 48/2231; F21S 48/225; F21S 48/2275; F21S 48/2281; F21S 48/2256; F21S 48/2237; F21S 48/2262; F21S 48/2268; F21S 48/2287; B60Q 1/0011
See application file for complete search history.

(56) References Cited

FOREIGN PATENT DOCUMENTS

| CN | 1189589 | 8/1998 |
| CN | 102470794 | 5/2012 |
| JP | 05-53005 U | 7/1993 |

(Continued)

OTHER PUBLICATIONS

Japanese Office Action with English Translation dated Oct. 28, 2014, 4 pages.

(Continued)

*Primary Examiner* — Robert May
(74) *Attorney, Agent, or Firm* — Rankin, Hill & Clark LLP

(57) ABSTRACT

A vehicle direction indicator light includes a light source and a light emitting body. The light emitting body guides light to the outside of the vehicle, and includes an outer emitting surface facing the outside of the vehicle, an inner emitting surface facing the inside of the vehicle, and a tip surface connecting the inner and outer emitting surfaces and facing a front or rear side of the vehicle. The outer emitting surface has a step shape in which a first surface portion that faces the outside of the vehicle and a second surface portion that faces the front side or the rear side of the vehicle are alternatingly connected to each other in a longitudinal direction of the vehicle. Light emitted through the second surface portion and the tip surface has a higher intensity than the light emitted through the first surface portion.

7 Claims, 11 Drawing Sheets

(52) U.S. Cl.
CPC ......... *F21S 48/2262* (2013.01); *F21S 48/2268* (2013.01); *F21S 48/24* (2013.01)

(56) References Cited

FOREIGN PATENT DOCUMENTS

| JP | 2005-347144 | 12/2005 |
| JP | 2009-087787 | 4/2009 |
| JP | 4300927 | 5/2009 |
| JP | 2012-174640 | 9/2012 |
| JP | 2012-206597 A | 10/2012 |
| KR | 2012-0061251 | 6/2012 |

OTHER PUBLICATIONS

Chinese Office Action with partial English translation of Search Report dated Sep. 25, 2015, 9 pages.

VEHICLE DIRECTION INDICATOR LIGHT HAVING A LIGHT EMITTING BODY INCLUDING AN OUTER EMITTING SURFACE, AN INNER EMITTING SURFACE, A TIP SURFACE, AND A LIGHT GUIDE BODY

CROSS-REFERENCE TO RELATED APPLICATION

Priority is claimed on Japanese Patent Application No. 2013-079762, filed on Apr. 5, 2013, the contents of which are incorporated herein by reference.

BACKGROUND

1. Field of the Invention

The present invention relates to a vehicle direction indicator light.

2. Description of Related Art

A vehicle direction indicator light has a light emission range that is defined as a standard in advance. Here, in addition to a main light distribution emitted in a front direction (advancing direction), in order to secure visibility, it is necessary to emit light in a range between 45 degrees to the inside and 80 degrees to the outside. In order to satisfy this standard, various solutions have been used for the vehicle direction indicator light.

For example, as shown in FIG. 11, a technique has been proposed in which a lens cut portion 102 that refracts a light O from a light source 101 toward the inside is formed in a part of an outer lens 100 to emit the light O in a direction at 45 degrees to the inside.

Further, a technique has also been proposed in which a design surface that reflects light from a light source is provided on a surface of a partition wall that divides the inside of a light chamber and the light reflected from the design surface is diffused and emitted to the outside to widen a light emission range (for example, see Japanese Patent Publication No. 4300927).

SUMMARY

However, as shown in FIG. 11, if the lens cut portion 102 is provided in a part of the outer lens 100, the appearance and a designability of the outer lens 100 are easily deteriorated. In particular, a direction indicator light is disposed in a front part of a vehicle that is the face of the vehicle and a rear part of the vehicle that is constantly viewed by a trailing vehicle or the like, and the outer lens thereof is a part of important components that easily influence the appearance and the designability of the vehicle combined with the shape of an outer plate of a vehicle body. Thus, it is not preferable that the lens cut portion that is easily involved in deterioration of the designability be provided in the outer lens.

Further, as disclosed in Japanese Patent Publication No. 4300927, if the light emission range is widened using the reflection from the design surface formed on the partition wall, the entire design surface is illuminated and thus provides uniform illumination with no change in the intensity of light. Thus, there is room for improvement of visibility.

An object of the invention is to provide a vehicle direction indicator light capable of enhancing visibility from a lateral side while securing light distribution in a longitudinal direction of a vehicle and having an excellent designability.

In order to achieve the object, aspects of the invention provide the following solutions.

(1) A vehicle direction indicator light according to an aspect of the invention includes: a light source; and a light emitting body that is disposed on the outside of a vehicle with reference to the light source and guides light from the light source to be emitted to the outside of the vehicle, in which the light emitting body includes an outer emitting surface that extends in a longitudinal direction of the vehicle and faces the outside of the vehicle, an inner emitting surface that extends in the longitudinal direction of the vehicle and faces the inside of the vehicle, and a tip surface that faces a front side or a rear side of the vehicle and connects the outer emitting surface and the inner emitting surface, the outer emitting surface is formed in a step shape in which a first surface portion that faces the outside of the vehicle and a second surface portion that faces the front side or the rear side of the vehicle are alternatingly connected to each other in the longitudinal direction of the vehicle, and the light from the light source is emitted to the outside through the first surface portion and is also emitted to the outside through the second surface portion and the tip surface with an intensity higher than that of the light emitted through the first surface portion.

According to the aspect (1), if the light source emits light according to an operation of a direction indicator or the like, the light emitting body guides the light to be emitted to the outside of the vehicle. Here, the light having high intensity is emitted to the front side or the rear side of the vehicle through the tip surface and the second surface portion of the outer emitting surface. Thus, it is possible to sufficiently secure light distribution in the longitudinal direction of the vehicle, and to clearly show a direction indication to a pedestrian, a trailing vehicle, an opposite vehicle or the like. Further, since it is possible to collectively illuminate the tip surface and the second surface portion, it is possible to increase the brightness of these portions and to vary the intensity of light to the light emitting body. Accordingly, it is possible to enhance the visibility from the front side or the rear side of the vehicle.

On the other hand, when seen from the lateral side of the vehicle, since the light having the intensity higher than that of the light emitted through the first surface portion in the outer emitting surface is emitted through the second surface portion, it is possible to effectively enhance the visibility from the lateral side, differently from uniform illumination with no change in the intensity of light in the related art. Accordingly, it is also possible to clearly show a direction indication to a pedestrian or a driver being in a direction in which the vehicle is turning, for example.

In addition, the light emitting body is formed in a "V" shape in a cross-sectional view by the outer emitting surface that faces the outside of the vehicle, the inner emitting surface that faces the inside of the vehicle and the tip surface that connects both the emitting surfaces, which forms a characteristic shape. Further, the outer emitting surface is formed in a step shape by the first surface portion and the second surface portion. Accordingly, it is possible to increase visual impact, and to enhance a designability. Thus, it is easy to achieve a remarkable individuality in appearance, and to achieve differentiation compared to other types. Further, since the outer emitting surface glares in a stripe form, it is possible to enhance the designability when light emits.

(2) In the aspect (1), the light emitting body may guide the light from the light source to the inner emitting surface, and may emit the light to the outside through the inner emitting surface.

In this case, since it is possible to illuminate the inner emitting surface that faces the inside of the vehicle, for example, it is possible to enhance the visibility to a pedestrian or a driver being on a side opposite the direction in which the vehicle is turning, and to clearly show a direction indication thereto.

(3) In the aspect (2), the light emitting body may emit the light from the light source through the inner emitting surface so that the intensity of the light is alternatingly varied in the longitudinal direction of the vehicle.

In this case, since it is possible to illuminate the inner emitting surface with the variation of the intensity of light, it is similarly possible to perform illumination in a stripe form with gradation to the outer emitting surface.

Accordingly, it is possible to enhance the visibility to a pedestrian or a driver being on a side opposite the direction in which the vehicle is turned. Further, since the inner emitting surface is illuminated in the stripe form, it is possible to further enhance the designability when light emits.

(4) In any one of the aspects (1) to (3), the light emitting body may include an inner lens and a light guide body that guides the light from the light source toward the inner lens, and the inner lens may be a multi-surface lens including the outer emitting surface, the inner emitting surface and the tip surface.

In this case, as the light guide body guides the light from the light source toward the inner lens and emits the light through the inner lens that includes the outer emitting surface, the inner emitting surface and the tip surface, it is possible to enhance the visibility from the lateral side while securing light distribution in the longitudinal direction of the vehicle. In particular, since it is preferable to form the outer emitting surface, the inner emitting surface and the tip surface in the inner lens having high workability, it is easy to simplify the configuration.

(5) In the aspect (4), a part of light incident onto the second surface portion in the inner lens, among the light from the light source, may be incident into the first surface portion and may be emitted to the outside while being repeatedly reflected inside the first surface portion.

In this case, it is possible to introduce a part of the light having high intensity emitted through the second surface portion of the outer emitting surface into the first surface portion to then be emitted to the outside of the vehicle while being repeatedly reflected inside the first surface portion. Here, the light that enters the first surface portion is reduced in its intensity as the reflection is repeated.

Thus, it is possible to gradually reduce the intensity of the light emitted through the second surface portion according to being distant from the first surface portion. Accordingly, it is possible to illuminate the outer surface portion while providing a highlight by the variation of the intensity of light, and to illuminate the outer emitting surface in a stripe form with clear gradation.

According to the aspects of the invention, it is possible to provide a vehicle direction indicator light capable of enhancing the visibility from the lateral side while securing light distribution in the longitudinal direction of the vehicle and having an excellent designability.

DESCRIPTION OF EMBODIMENTS

First Embodiment

Hereinafter, a first embodiment of the invention will be described with reference to the accompanying drawings.

In the present embodiment, a case where a vehicle direction indicator light is applied to a front turn signal light (hereinafter, simply referred to as a turn signal light) that is a front direction indicator light provided in a front part of a vehicle will be described as an example.

Figure 1:
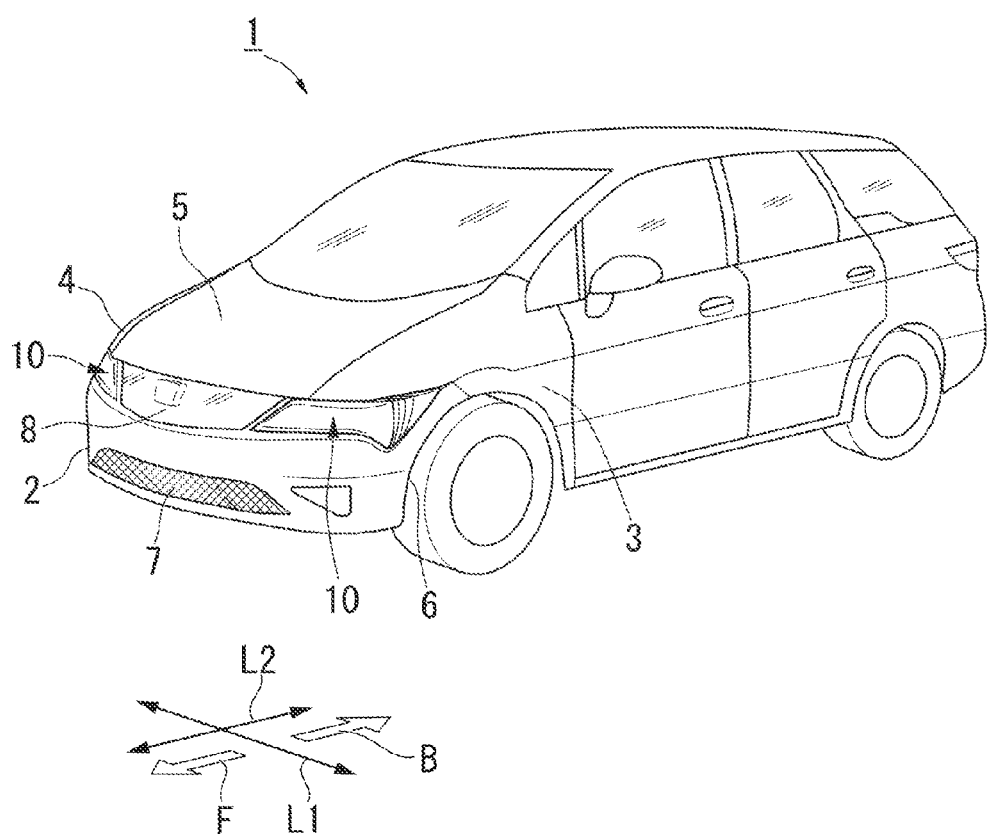
FIG. 1 is a diagram illustrating a first embodiment of the invention, which is an appearance perspective view of a vehicle provided with a turn signal light (vehicle direction indicator light), seen from a front left side.

As shown in FIG. 1, a vehicle body 1 of a vehicle is covered, in its front part, by a front buffer 2, right and left fender panels 3 and 4, a bonnet 5 and the like. The front buffer 2 is formed so that right and left ends thereof are bent and extended up to wheel arches 6. A grill 7 that introduces a travelling wind into an engine room (not shown) is provided in a front lower part of the front buffer 2.

Above the front buffer 2, a front garnish 8 is provided between the front buffer 2 and the bonnet 5 in a central part in a vehicle width direction L1, and headlight units 10 are provided between the fender panels 3 and 4 and the bonnet 5 on opposite sides in the vehicle width direction L1.

In the present embodiment, respective directions are defined based on a direction of the vehicle shown in FIG. 1. That is, in a longitudinal direction L2 of the vehicle, a front side with reference to a driver is defined as a front side F, and an opposite side thereof is defined as a rear side B. Further, a right-hand side of the driver is defined as a right side, and a left-hand side thereof is defined as a left side. Furthermore, a side above the driver is defined as an upper side, and a side below the driver is defined as a lower side. The vehicle shown in FIG. 1 is an example, and thus, the type, the size or the like of the vehicle is not limited thereto.

The right and left headlight units 10 have a relationship of lateral symmetry, but their configurations are the same. Thus, in the present embodiment, the left headlight unit 10 will be described in detail, and the right headlight unit 10 will not be described again here.

Configuration of Headlight Unit

Figure 2:
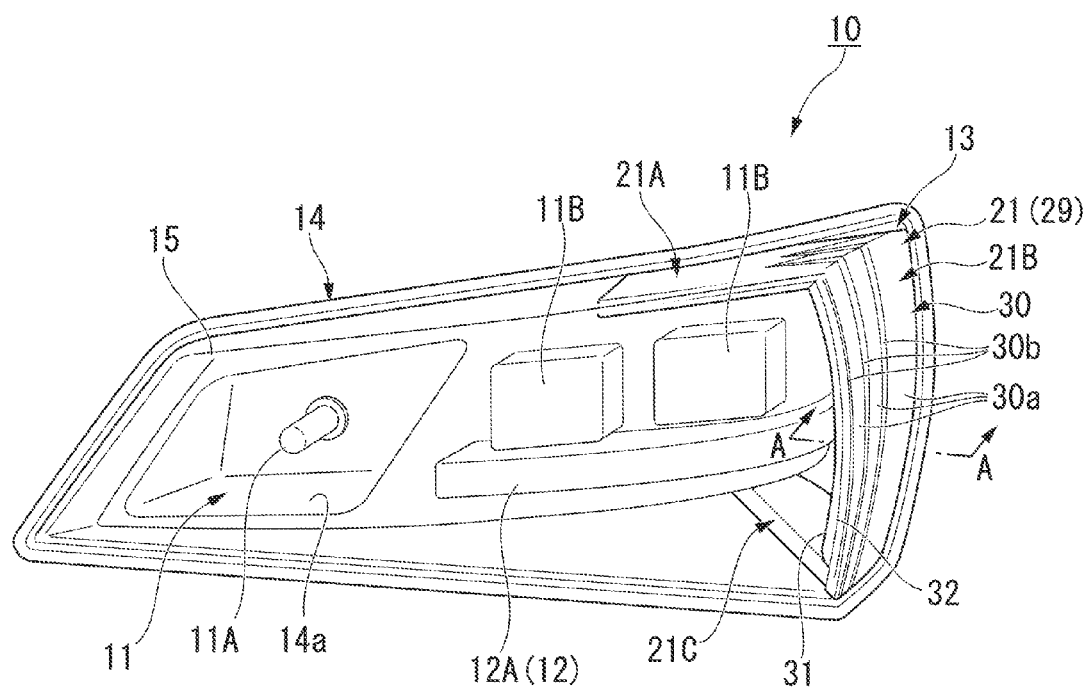
FIG. 2 is an enlarged appearance diagram illustrating a left headlight unit shown in FIG. 1.
Figure 2:
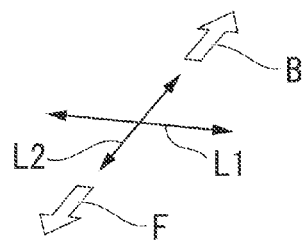
Figure 3:
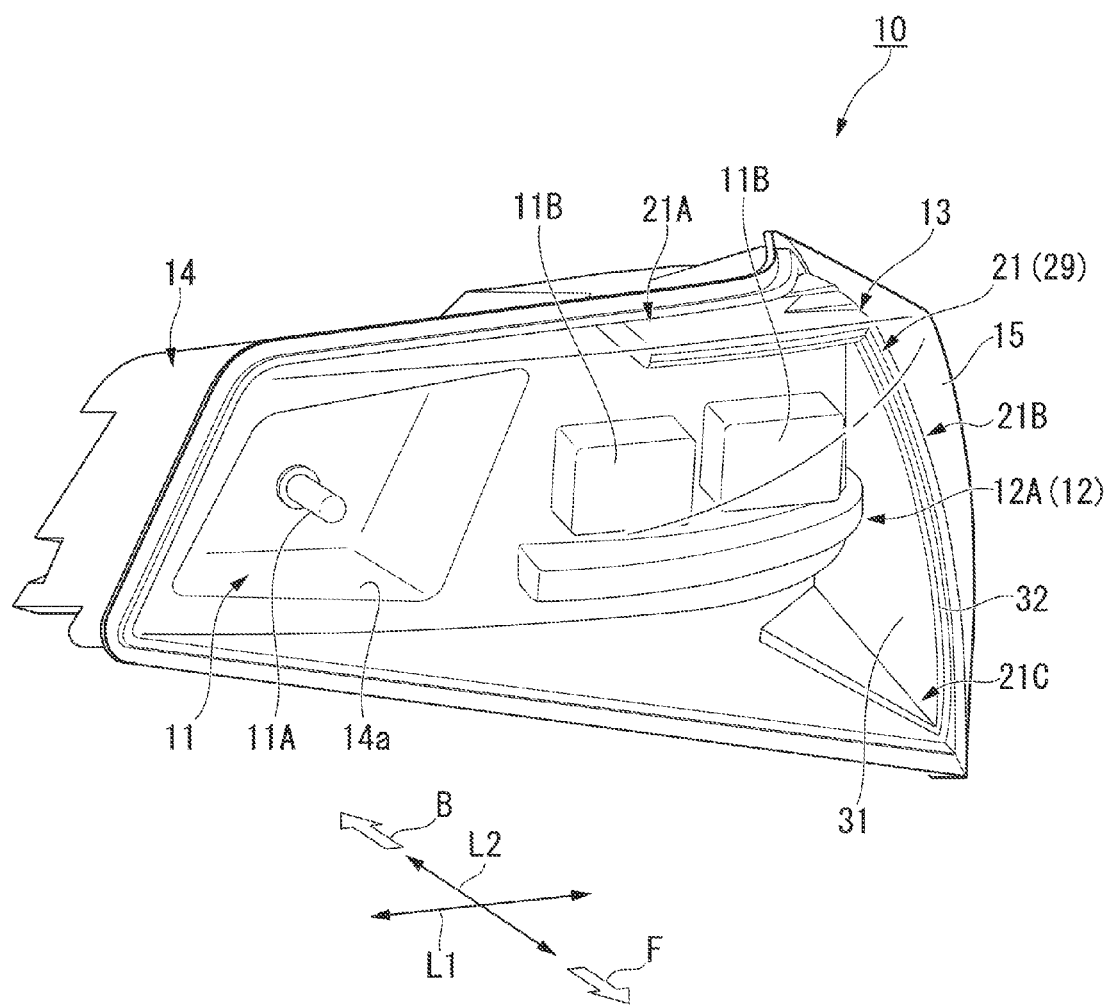
FIG. 3 is an appearance perspective view of the headlight unit shown in FIG. 2, seen from the inside the vehicle.

As shown in FIGS. 2 and 3, the headlight unit 10 is a unit that includes a combination of a headlight 11, a position light 12 that is a sidelight, and a turn signal light (vehicle direction indicator light) 13.

The headlight 11, the position light 12 and the turn signal light 13 are mounted to a common housing 14, and are covered by a common outer lens 15.

The outer lens 15 is made of a transparent material so that the inside can be viewed from the outside, and thus, it is possible to view an inner lens 21 and the like of the turn signal light 13 to be described later from the outside.

The headlight 11 includes a high beam lamp 11A that emits a high beam light, and a low beam lamp (not shown) that emits a low beam light and is covered by an inner lens 11B.

The high beam lamp 11A is disposed in a reflector 14a provided in the housing 14. In an example shown in the figure, the high beam lamp 11A is shown as a high intensity lamp, but may also employ an LED or the like. The low beam lamps are arranged in alignment with the high beam lamp 11A in the vehicle width direction L1, and in the shown example, two low beam lamps are provided. However, the number of low beam lamps is not limited to two.

In the present embodiment, a configuration that the headlight 11 respectively includes the high beam lamp 11A and the low beam lamps is shown as an example, but the invention is not limited thereto. For example, a configuration in which a common head lamp is provided and irradiation direction of light from the head lamp is switched up and down to form a high beam or a low beam may be used.

The position light 12 includes a position lamp (not shown), and an inner lens 12A that covers the position lamp. The inner lens 12A is placed under the inner lenses 11B of the low beam lamps in the headlight 11, and is formed in a transversely long shape that extends in the vehicle width direction L1. The inner lens 12A is formed to gradually extend toward the rear side B as it goes from the inside of the vehicle to the outside (left side) thereof.

Turn Signal Light

As shown in FIGS. 2 to 5, the turn signal light 13 includes a turn lamp (light source) 20, and a light emitting body 29 that is disposed on the front side F of the vehicle (on the outside of the vehicle) with reference to the turn lamp 20 and guides light from the turn lamp 20 to be emitted to the outside of the vehicle.

Figure 5:
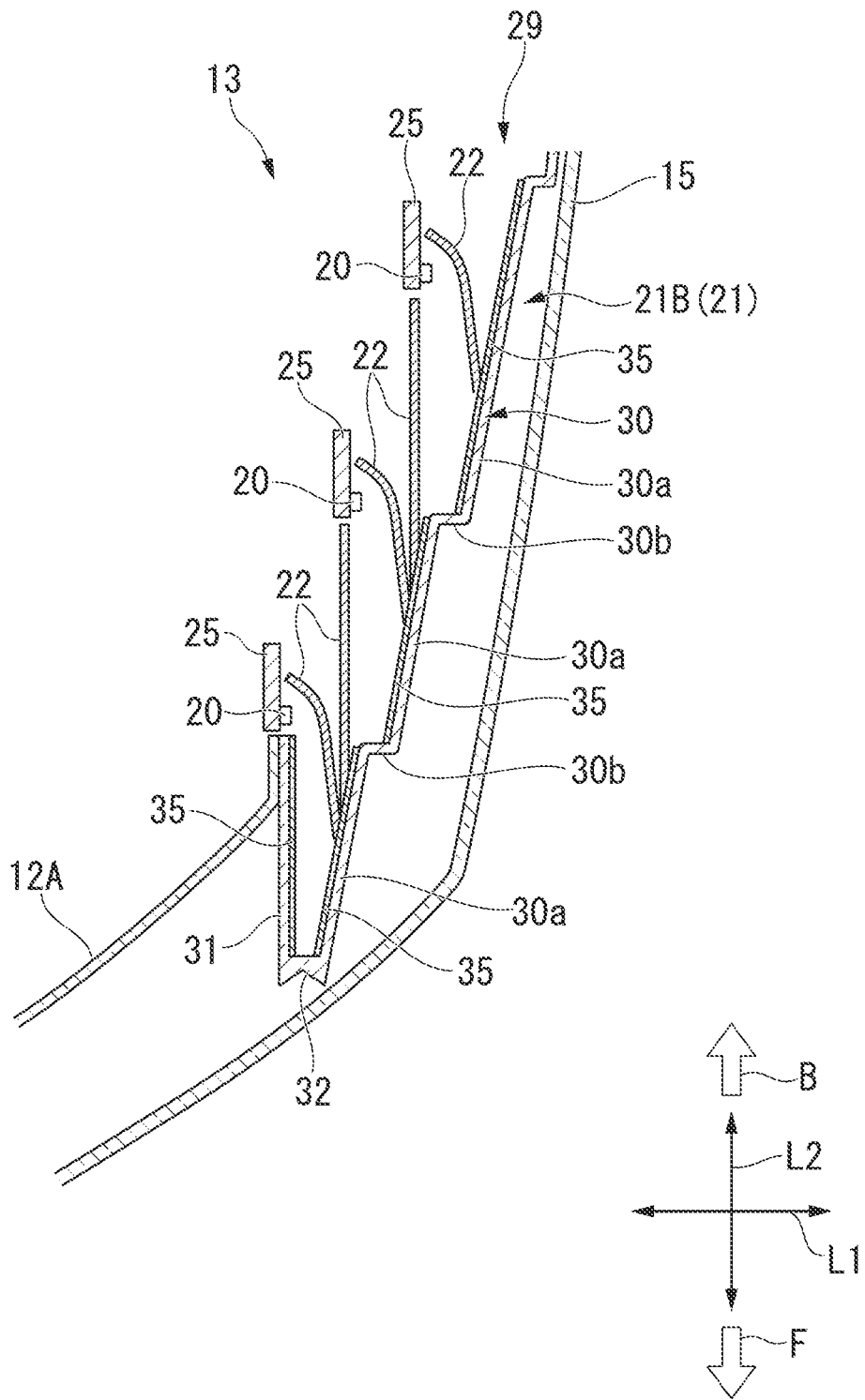
FIG. 5 is a cross-sectional view of the turn signal light that forms the headlight unit shown in FIG. 2, taken along ling A-A in FIG. 2.

As shown in FIG. 5, as the turn lamp 20, for example, a bulb, a high intensity LED or the like may be used, but in the shown example, an LED is shown as an example. The turn lamp 20 is mounted on a control board 25 on which a control circuit that controls light emission and the like are mounted, for example. In the shown example, the turn lamp 20 is fixed in a state of being directed to the outside (left side) of the vehicle. Here, the turn lamps 20 are provided in three rows in accordance with the shape of the inner lens 21 to be described later, and are arranged in a state where the positions thereof shift from each other in the longitudinal direction L2 and the vehicle width direction L1 of the vehicle.

Emission of these three rows of turn lamps 20 is controlled by the above-mentioned control circuit or the like for flickering according to an operation of a direction indicator, a hazard switch or the like (not shown). The turn lamps 20 may directly emit light of an orange color or a brown color, or may emit light of a different color so that the light is emitted to the outside as light of the orange color or the brown color after passing through the inner lens 21 to be described later.

The light emitting body 29 includes the inner lens 21 that covers the turn lamps 20, and reflectors (light guide bodies) 22 that are provided between the turn lamps 20 and the inner lens 21 and guide light from the turn lamps 20 toward the inner lens 21.

As shown in FIGS. 2 and 3, the inner lens 21 is formed to extend toward the front side F of the vehicle, and thus has a three-dimensional shape with a three-dimensional characteristic that the inner lens 21 covers a part of the headlight 11 and the position light 12 from the upper side and from the outside (left side) of the vehicle.

Figure 4:
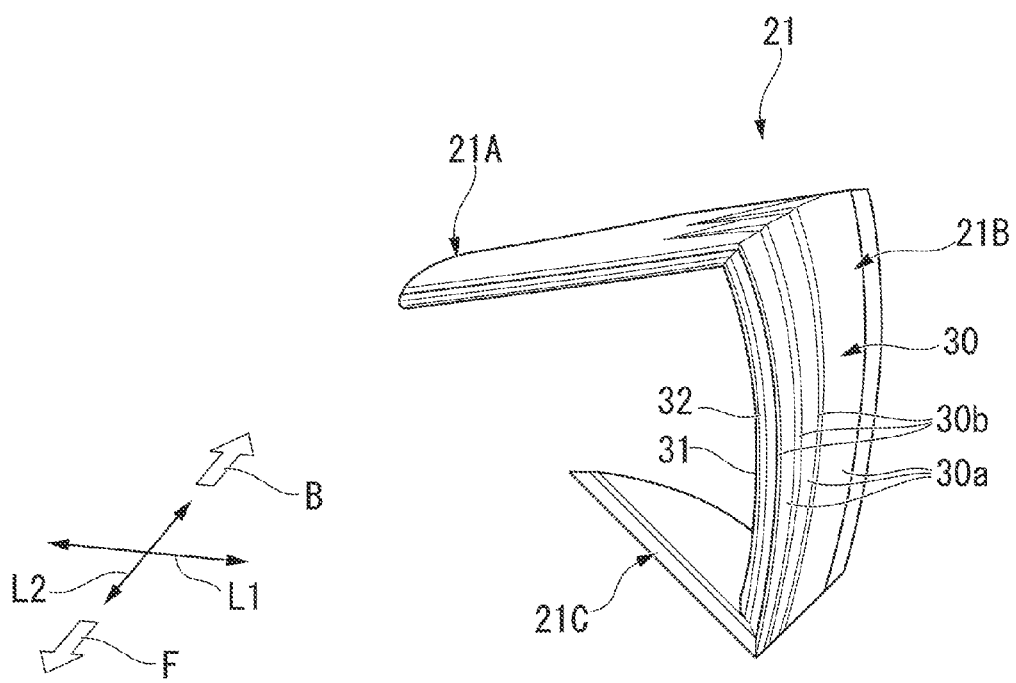
FIG. 4 is a front view of an inner lens of a turn signal light that forms the headlight unit shown in FIG. 2.

Specifically, as shown in FIGS. 2 to 4, the inner lens 21 is integrally formed with an upper lens portion 21A of a pent roof shape that is disposed above the headlight 11 and covers a part of the headlight 11 and the position light 12 from the upper side, a side lens portion 21B of a pent roof shape that is connected to an outer end part of the upper lens portion 21A in the vehicle width direction L1, is disposed on the left side of the headlight 11 and the position light 12 and covers the headlight 11 and the position light 12 from the outside (left side) of the vehicle, and a lower lens portion 21C of a pent roof shape that is connected to a lower end part of the side lens portion 21B, is disposed under the position light 12 and covers a part of the position light 12 from the lower side of the vehicle.

The upper lens portion 21A and the side lens portion 21B are connected to each other so that an angle formed by the lens portions 21A and 21B is about 90 degrees. Further, the side lens portion 21B and the lower lens portion 21C are connected to each other so that an angle formed by the lens portions 21B and 21C is an acute angle smaller than 90 degrees.

The upper lens portion 21A is formed to gradually extend toward the front side F as it goes from the inside of the vehicle to the outside (left side) thereof. Therefore, the side lens portion 21B is similarly formed to extend toward the front side F, similarly.

Here, as described above, since the inner lens 12A of the position light 12 is formed to gradually extend in the rear side B as it goes from the inside of the vehicle to the outside (left side) thereof, as shown in FIGS. 2 and 3, it is possible to achieve a visual effect that the position light 12 enters an inner surface lens portion 31 of the side lens portion 21B to be described later.

In addition, since the inner surface lens portion 31 of the side lens portion 21B is exposed, it is possible to view the inner surface lens portion 31 from the right side of the vehicle that is a side opposite to a side where the headlight unit 10 is provided.

The side lens portion 21B of the inner lens 21 will be described in detail.

As shown in FIGS. 4 and 5, the side lens portion 21B includes an outer surface lens portion (outer emitting surface) 30, the inner surface lens portion (inner emitting surface) 31, and a tip portion (tip surface) 32 that connects the outer surface lens portion 30 and the inner surface lens portion 31, which forms a multi-surface lens having a "V" shape in a cross-sectional view.

The outer surface lens portion 30 extends from the rear side B of the vehicle to the front side F thereof (extends in the longitudinal direction L2 of the vehicle), and is formed in a surface shape that faces the outside (left side) of the vehicle. The inner surface lens portion 31 extends from the front side F of the vehicle to the rear side B thereof (extends in the longitudinal direction L2 of the vehicle), and is formed in a surface shape that faces the inside of the vehicle. The tip portion 32 is most protruded toward the front side F.

The outer surface lens portion 30 is entirely formed in the surface shape as described above, but more specifically, is formed in a step shape in which a first surface portion 30a that faces the outside (left side) of the vehicle and a second surface portion 30b that faces the front side F of the vehicle are alternatingly provided along the longitudinal direction L2 of the vehicle. In the shown example, the outer surface lens portion 30 is formed in a three-step shape having three first surface portions 30a. Here, the turn lamps 20 are provided in three rows corresponding to the three-step shape.

As shown in FIG. 5, in the side lens portion 21B having the above configuration, a functional film 35 that reduces light transmittance is formed on the first surface portion 30a of the outer surface lens portion 30 and on an inner surface of the inner surface lens portion 31.

As the functional film 35, for example, an Al deposition film having a light transmittance of 80% may be used. However, the functional film 35 is not an essential element, and thus, may not be provided. Further, instead of the functional film 35, for example, surface texturing or the like may be performed to reduce the transmittance.

The reflector 22 reflects light from the turn lamp 20 and guides the light toward the inner lens 21. Here, as shown in a part (a) of FIG. 6, the reflector 22 has a reflection angle or the like designed to collectively guide a light O1 that occupies most of the light from each turn lamp 20 toward the second surface portion 30b of the outer surface lens portion 30 and the tip portion 32 and to guide the remaining light O2 toward the first surface portion 30a of the outer surface lens portion 30 and the inner lens portion 31.

Thus, it is possible to emit the light O1 having an intensity higher than that of the light O2 emitted through the first surface portion 30a and the inner lens portion 31, through the second surface portion 30b and the tip portion 32. Further, since the functional film 35 that partially reduces the light transmittance is formed on the inner surface of the inner lens portion 21, this point allows to emit the light O1 having high intensity through the second surface portion 30b and the tip portion 32.

Figure 6:
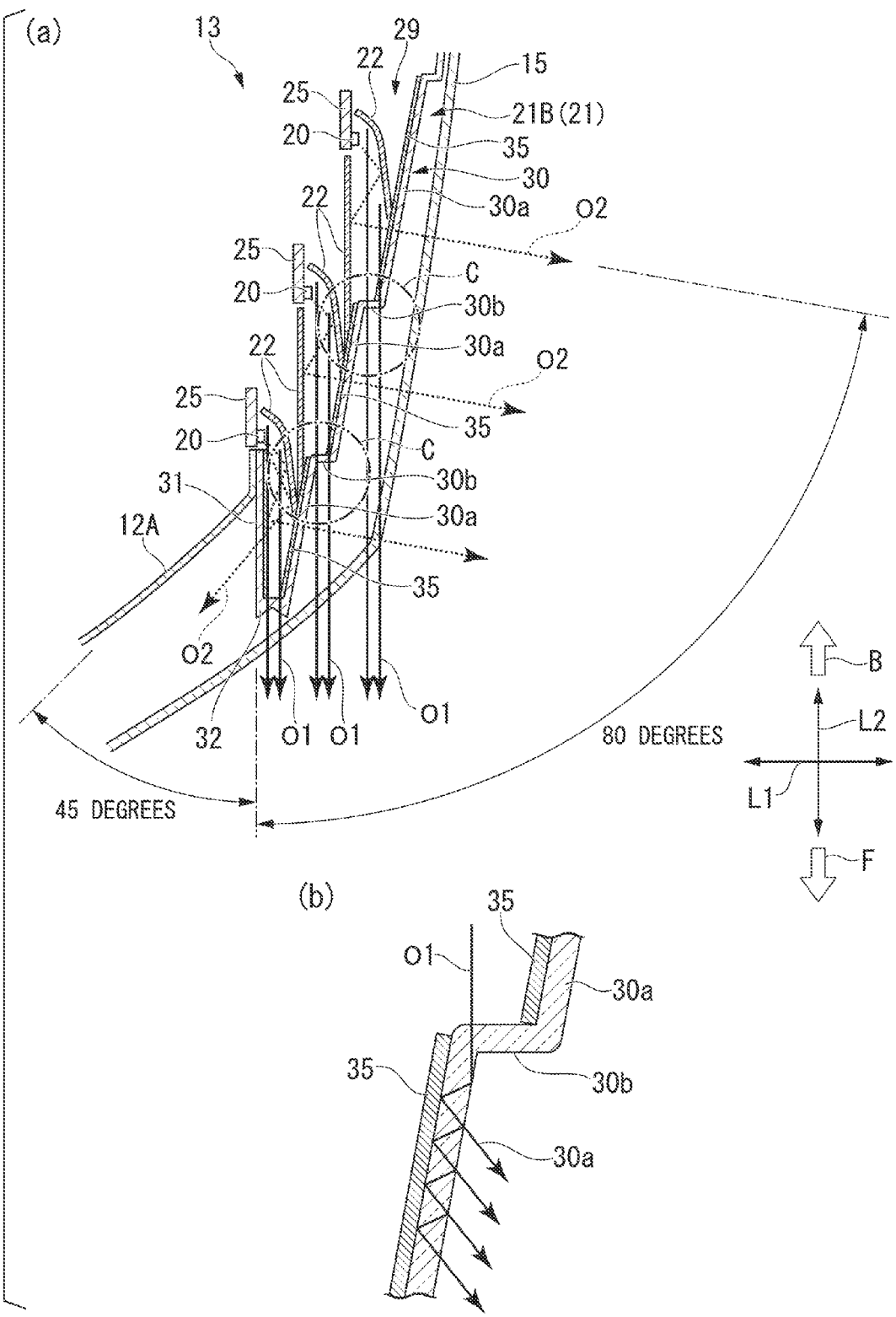
FIG. 6 is diagram illustrating a state where a turn lamp is turned on from a state shown in FIG. 5, in which a part (a) is a whole diagram and a part (b) is an enlarged view of a part C shown in the part (a).

Further, as shown in a part (b) of FIG. 6, a part of the light O1 having high intensity guided to the second surface portion 30b of the outer surface lens portion 30 by the reflector 22 enters the first surface portion 30a, and then is repeatedly reflected inside the first surface portion 30a to be emitted to the outside. Here, as described above, since the functional film 35 is formed on the inner surface of the first surface portion 30a, when the reflection is repeated inside the first surface portion 30a, it is possible to reliably emit the light toward the outside (left side) of the vehicle while preventing the light from being incident to the inside of the vehicle.

Operation of Headlight Unit

Next, an operation of the headlight unit 10 having the above configuration will be described.

During driving the vehicle, for example, if the direction indicator is operated to change the direction, the turn lamps 20 emit light. Then, as shown in the part (a) of FIG. 6, the reflectors 22 guide the light toward the inner lens 21 to then be emitted to the outside through the inner lens 21 while being repeatedly reflected therein.

Here, since the light is collectively guided toward the tip portion 32 of the inner lens 21 and the second surface portion 30b of the outer surface lens portion 30, it is possible to emit the light O1 having a high intensity toward the front side F of the vehicle. Thus, it is possible to sufficiently secure light distribution toward the front side F of the vehicle, and to clearly show a direction indication to a pedestrian, an opposite vehicle or the like.

In addition, since it is possible to collectively brighten the tip portion 32 and the second surface portion 30b, it is possible to increase the brightness of these portions to vary the intensity of light to the inner lens 21. Accordingly, it is possible to enhance the visibility from the front side F of the vehicle.

On the other hand, when seen from the left side of the vehicle, since the light O1 having the intensity higher than that of the light O2 emitted through the first surface portion 30a of the outer surface lens portion 30 is emitted through the second surface portion 30b, it is possible to vary the intensity of light to illuminate the entirety of the outer surface lens portion 30, differently from uniform illumination with no change in the intensity of light in the related art. Thus, it is possible to illuminate the entirety of the outer surface lens portion 30 in a stripe form with gradation, and it is thus possible to effectively enhance the visibility from the left side.

Accordingly, for example, it is also possible to clearly show a direction indication to a pedestrian or a driver being in a direction in which the vehicle is turning.

Further, as shown in the part (b) of FIG. 6, it is possible to guide a part of the light O1 having high intensity emitted through the second surface portion 30b of the outer surface lens portion 30 into the first surface portion 30a and then emitted to the outside (left side) of the vehicle while being repeatedly reflected inside the first surface portion 30a. Here, the light that enters the first surface portion 30a is reduced in its intensity as the reflection is repeated. Thus, it is possible to gradually reduce the intensity of light according to the distant from the second surface portion 30b.

Accordingly, it is possible to illuminate the outer surface lens portion 30 while providing a highlight by the variation of the intensity of light, and to illuminate the outer surface lens portion 30 in a stripe form with clear gradation.

Further, as shown in the part (a) of FIG. 6, in addition to the outer surface lens portion 30, it is also possible to perform illumination with respect to the inner surface lens portion 31 capable of being viewed from the right side of the vehicle, and thus, it is similarly possible to enhance the visibility to a pedestrian or a driver being on the right side of the vehicle, that is, on opposite side of the direction in which the vehicle is turning, and in this case, it is similarly possible to clearly show a direction indication.

As described above, according to the headlight unit 10 provided with the turn signal light 13 according to the present embodiment, as shown in the part (a) of FIG. 6, it is possible to sufficiently secure light distribution in the front direction of the vehicle, and to secure excellent visibility from a lateral side while emitting light in the light emission range between 80 degrees on the outside and 45 degrees on the inside.

Further, the inner lens 21 includes the side lens portion 21B, of a "V" shape when seen on a cross section, that include the outer surface lens portion 30, the inner surface lens portion 31 and the tip portion 32, and the upper lens portion 21A and the lower lens portion 21C to form the characteristic three-dimensional shape, and the outer surface lens portion 30 includes the first surface portions 30a and the second surface portions 30b to form the three-step shape.

Accordingly, it is possible to increase visual impact, and to enhance the designability. Thus, it is easy to achieve a remarkable individuality in appearance and to achieve differentiation compared to other types of headlight units. Further, since the outer surface lens portion 30 is illuminated in the stripe form, it is possible to enhance the designability when light emits.

Further, when the turn signal light 13 is flickered in a state where the headlight 11 or the position light 12 is turned on, as shown in FIG. 3, due to the characteristic three-dimensional shape that the inner lens 21 of the turn signal light 13 covers the headlight 11 and the position light 12 from the upper side and the left side, it is possible to accurately combine lights from the respective lights, and to express a characteristic light emitting pattern that is strong in three dimensions and is impressive. Accordingly, for example, it is possible to give an added value to the vehicle, and to perform strong linking of the light emitting pattern and the vehicle, capable of specifying the vehicle from the light emitting pattern.

Second Embodiment

Next, a second embodiment of the invention will be described.

The second embodiment is different from the first embodiment in that a light guide path is used as a light guide body, compared with the first embodiment in which the reflector 22 is used as the light guide body and the light from the turn lamp 20 is guided to the inner lens 21 while being reflected. Further, in the present embodiment, the functional film 35 according to the first embodiment is not formed.

Configuration of Turn Signal Light

Figure 7:
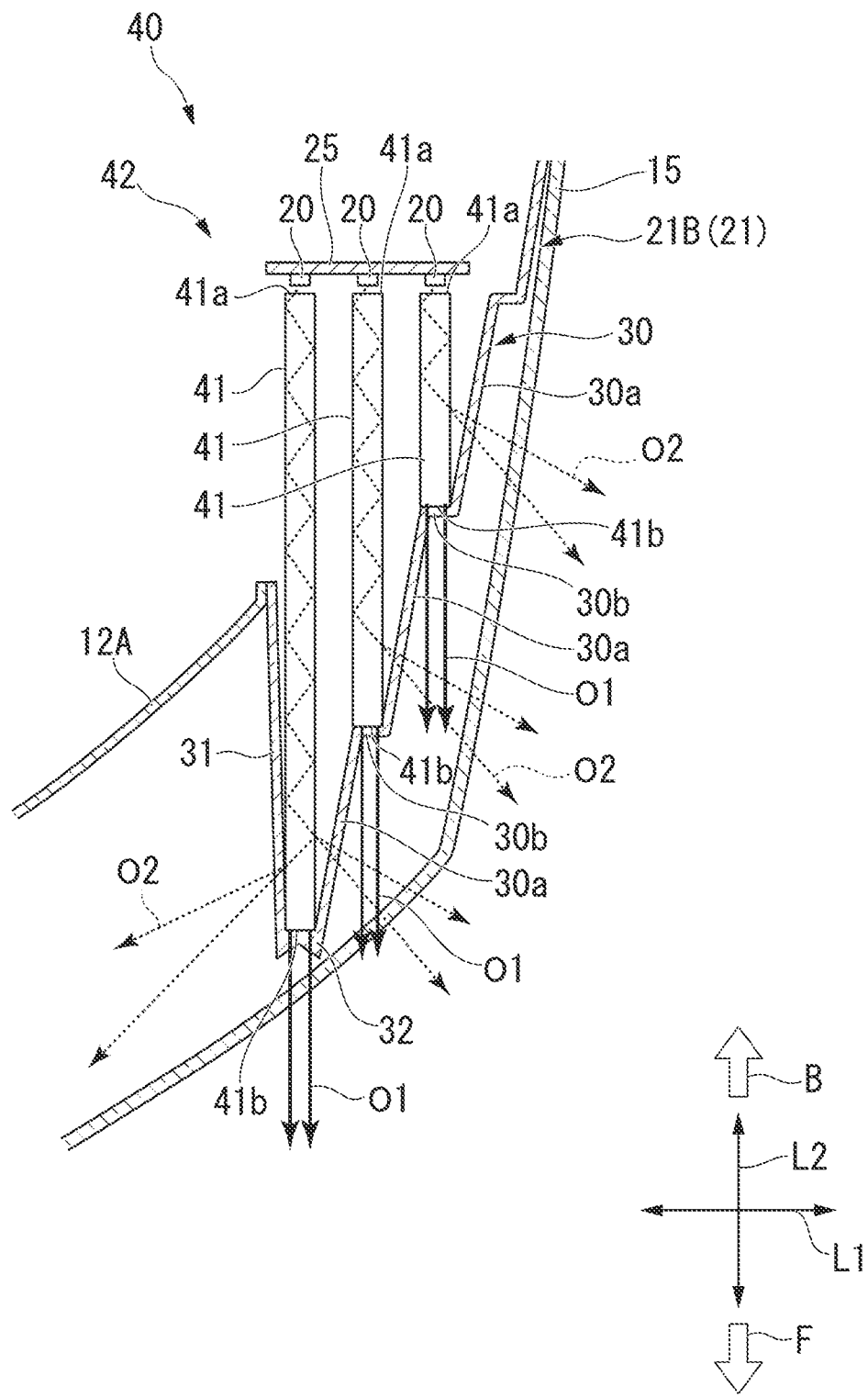
FIG. 7 is a cross-sectional view of a turn signal light according to a second embodiment of the invention.

As shown in FIG. 7, a turn signal light 40 (vehicle direction indicator light) according to the present embodiment is disposed toward the front side F of the vehicle in a state where three rows of turn lamps 20 are mounted on the common control board 25. Further, a light guide path 41 that guides light from each turn lamp 20 toward the inner lens 21 is disposed between the turn lamp 20 and the inner lens 21.

The inner lens 21 and the light guide paths 41 form a light emitting body 42.

The light guide paths 41 are arranged in three rows corresponding to the three rows of turn lamps 20, and are arranged with intervals in the vehicle width direction L1 so as to be disposed between the turn lamps 20 and the tip portion 32 and between the turn lamps 20 and the second surface portion 30b of the outer surface lens portion 30.

Further, the light from the turn lamp 20 is incident into the light guide path 41 through an incident end 41a positioned at one end of the light guide path 41, and advances toward an emitting end 41b positioned at the opposite end thereof while being repeatedly reflected inside the light guide path 41.

Here, the light guide path 41 is designed so that most of the light incident through the incident end 41a is emitted through the emitting end 41b, by adjustment of a reflection condition or the like, for example. Thus, it is possible to emit the light O1 that occupies most of the light from the turn lamp 20 to the outside through the tip portion 32 and the second surface portion 30b.

On the other hand, a part of the light incident through the incident end 41a of the light guide path 41 is leaked to the outside of the light guide path 41 on the way to the emitting end 41b to form a leaked light O2 having low intensity, which is emitted through the first surface portion 30a of the outer surface lens portion 30 and the inner surface lens portion 31.

Operation of Turn Signal Light

According to the turn signal light 40 having such a configuration, it is similarly possible to guide the light O1 that occupies most of the light from the turn lamps 20 toward the tip portion 32 and the second surface portion 30b using the light guide paths 41, and thus, it is possible to collectively brighten the tip portion 32 and the second surface portion 30b. Thus, it is possible to increase the brightness of these portions to vary the intensity of light to the inner lens 21. Accordingly, it is possible to enhance the visibility from the front side F of the vehicle.

Further, it is possible to illuminate the outer surface lens portion 30 in a stripe form with gradation using the leaked light O2, and thus, it is possible to effectively enhance the visibility from the left side of the vehicle. Further, since it is possible to perform illumination with respect to the inner surface lens portion 31, and thus, it is also possible to enhance the visibility from the right side of the vehicle.

In this way, according to the turn signal light 40 of the present embodiment, it is similarly possible to achieve the same effects as the first embodiment.

According to the present embodiment, similar to the first embodiment, it is possible to guide a part of the light O1 having high intensity emitted through the second surface portion 30b of the outer surface lens portion 30 into the first surface portion 30a to be emitted to the outside of the vehicle while being repeatedly reflected inside the first surface portion 30a.

Modification Examples

Figure 8:
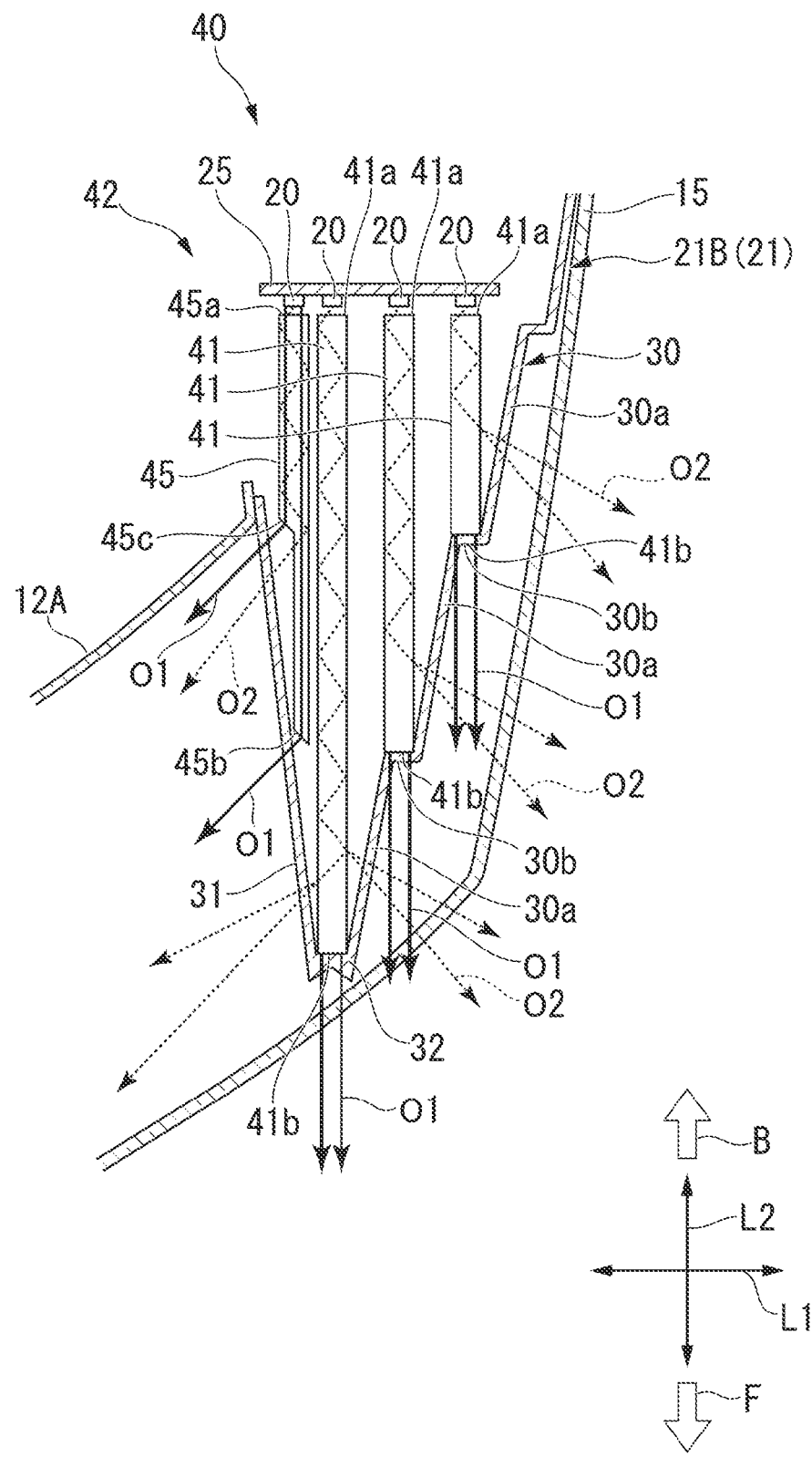
FIG. 8 is a cross-sectional view of a turn signal light according to a modification example of the second embodiment.

In the above-described second embodiment, as shown in FIG. 8, a second light guide path 45 that collectively guides light toward the inner surface lens portion 31 may be provided between the light guide path 41 that guides light from the turn lamp 20 toward the tip portion 32 and the inner surface lens portion 31, and a turn lamp 20 that allows light to be incident into an incident end 45a of the second light guide path 45 may be additionally mounted on the control board 25.

The second light guide path 45 is configured so that an emitting end 45b that is the front end thereof is inclinedly cut to face the inner surface lens portion 31 and an emitting opening 45c is formed to face the inner surface lens portion 31 between the incident end 45a and the emitting end 45b. With this configuration, the second light guide path 45 can locally emit the light O1 that occupies most of the light from the additional turn lamp 20 toward the inner surface lens portion 31 through the emitting opening 45c and the emitting end 45b.

Accordingly, similar to the outer surface lens portion 30, it is possible to perform illumination with the variation of the intensity of light being given to the inner surface lens portion 31 in the longitudinal direction L2 of the vehicle. Thus, it is possible to illuminate the inner surface lens portion 31 in a stripe form with gradation.

Accordingly, it is possible to further enhance the visibility to a pedestrian or a driver being on the right side of the vehicle, that is, on opposite side of the direction in which the vehicle is turning. Further, since it is possible to illuminate the inner surface lens portion 31 in the stripe form, it is possible to further enhance the designability when light emits.

Third Embodiment

Next, a third embodiment of the invention will be described.

The third embodiment is different from the second embodiment in that a light emitting body 51 is formed by only three rows of light guide paths 52, compared with the second embodiment in which the light emitting body 42 is formed by the inner lens 21 and the light guide paths 41. Thus, in the present embodiment, the inner lens 21 according to the first embodiment and the second embodiment is not provided.

Configuration of Turn Signal Light

Figure 9:
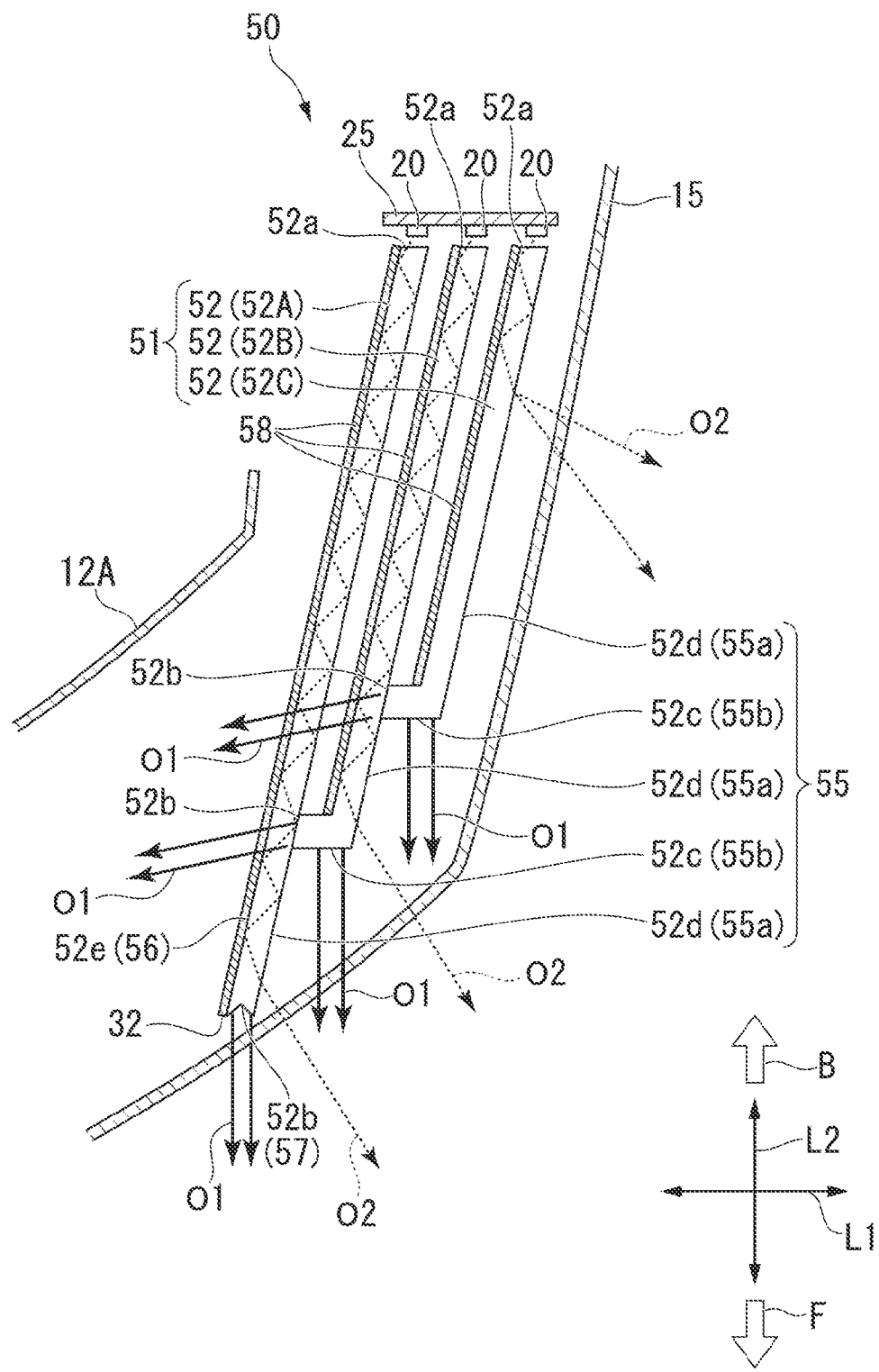
FIG. 9 is a cross-sectional view of a turn signal light according to a third embodiment of the invention.

As shown in FIG. 9, a turn signal light (vehicle direction indicator light) 50 according to the present embodiment has a configuration in which a light emitting body 51 is formed by three light guide paths 52 arranged in the vehicle width direction L1.

The light guide path 52 (52A) positioned on the inside of the vehicle among the three light guide paths 52 is formed in a straight shape from an incident end 52a positioned on one end side toward an emitting end 52b positioned on the other end side. Thus, the emitting end 52b of this light guide path 52 (52A) faces the front side F of the vehicle.

On the other hand, the light guide path 52 (52B) positioned on the left side of the vehicle with reference to the light guide path 52 (52A) has a length shorter than that of the light guide path 52 (52A), and the front end side thereof is bent toward the inside of the vehicle so that the emitting end 52b is in contact with a side surface of the light guide path 52 (52A). Thus, a side surface 52c of a bent portion of the light guide path 52 (52B) faces the front side F of the vehicle in a state of being positioned on the rear side B of the vehicle with reference to the emitting end 52b of the light guide path 52 (52A).

Further, the light guide path 52 (52C) positioned on the leftmost side of the vehicle has a length shorter than that of the light guide path 52 (52B), and the front end side thereof is bent toward the inside of the vehicle so that the emitting end 52b is in contact with a side surface of the light guide path 52 (52B). Thus, a side surface 52c of a bent portion of the light guide path 52 (52C) faces the front side F of the vehicle in a state of being positioned on the rear side B of the vehicle with reference to the side surface 52c of the light guide path 52 (52B).

As described above, the light emitting body 51 according to the present embodiment is configured by three light guide paths 52 (52A, 52B and 52C) having the different lengths in the longitudinal direction L2 of the vehicle, in which the front end sides of two light guide paths 52 (52B and 52C) are bent toward the inside of the vehicle.

Thus, according to the present embodiment, similar to the case where the inner lens 21 is provided, the light emitting body 51 includes an outer emitting surface 55 that faces the outside of the vehicle, an inner emitting surface 56 that faces the inside of the vehicle, and a tip surface 57 that connects both of the emitting surfaces 55 and 56, in which the outer emitting surface 55 is formed in a step shape by first surface portions 55a and second surface portions 55b.

Specifically, in the three light guide paths 52 (52A, 52B and 52C), side surfaces 52d positioned on the outside of the vehicle respectively serve as the first surface portions 55a. Further, in the two light guide paths 52 (52B and 52C) of which the front end side is bent, the side surfaces 52c of the bent portions serve as the second surface portions 55b that face the front side F of the vehicle. Thus, the outer emitting surface 55 is formed by the first surface portions 55a and the second surface portions 55b.

Further, in the light guide path 52 (52A) positioned on the inside of the vehicle, the emitting end 52b that faces the front side F of the vehicle serves as the tip surface 57, and a side surface 52e positioned on the inside of the vehicle serves as the inner emitting surface 56.

According to the turn signal light 50 including the light emitting body 51 formed by the three light guide paths 52 (52A, 52B and 52C) having such a configuration, it is similarly possible to achieve the same effects as in the second embodiment. That is, it is possible to enhance the visibility from the lateral side while securing the light distribution toward the front side F of the vehicle.

In addition, it is possible to emit the light O1 having high intensity from each of the emitting ends 52b of the two light guide paths 52 (52B and 52C) of which the front end side is bent toward the inside of the vehicle, and thus, to illuminate the inner emitting surface 56 in a stripe form.

In the present embodiment, in each of the light guide paths 52 (52A, 52B and 52C), for example, a surface treatment for coating a film 58 on the side surface 52e positioned on the inside of the vehicle by deposition or the like may be performed to prevent leakage of a light O2.

With this configuration, it is possible to emit only the light O1 having the high intensity emitted from the emitting end 52b toward the inside of the vehicle, and to perform illumination in a stripe form with clear gradation.

The technical scope of the invention is not limited to the above-described embodiments, but may include various modifications in a range without departing from the spirit of the invention.

For example, in the above-described embodiments, a case where the vehicle direction indicator light is applied to a front turn signal light that is a front direction indicator light is shown as an example, but the invention is not limited to this case. For example, the direction indicator light may be applied to a rear turn signal light that is a rear direction indicator light provided in a rear portion of the vehicle.

Figure 10:
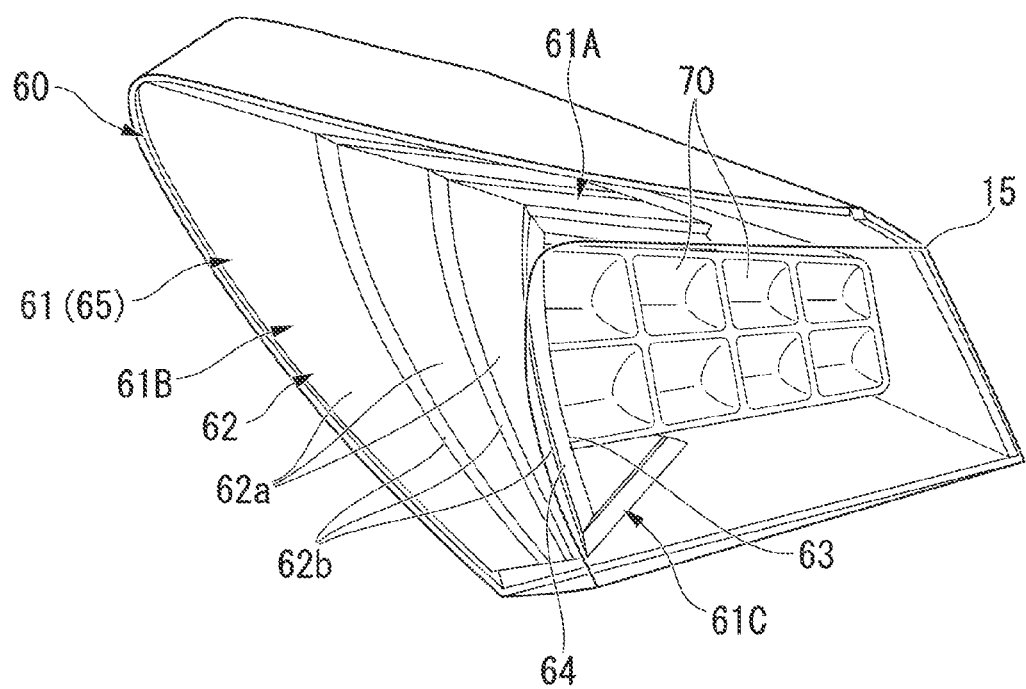
FIG. 10 is an appearance perspective view illustrating an embodiment in a case where a vehicle direction indicator light according to the invention is applied to a rear turn signal light.
Figure 10:
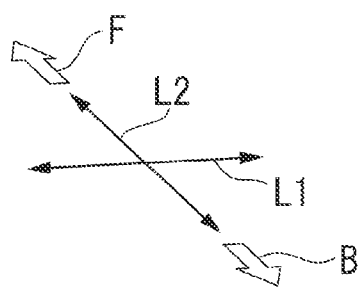
Figure 11:
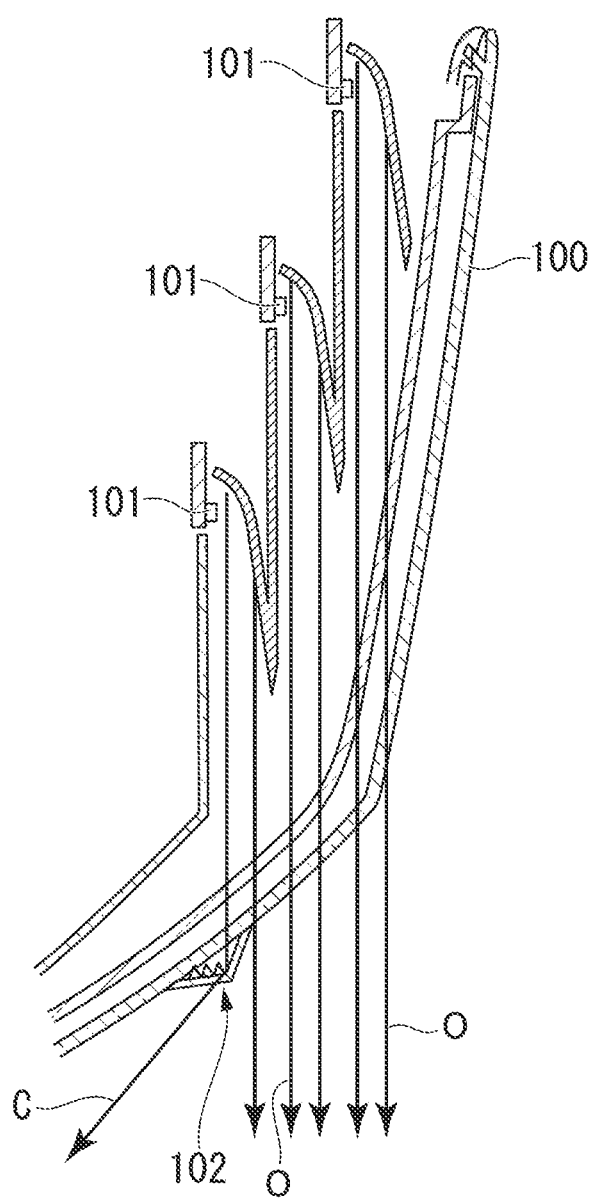
FIG. 11 is a cross-sectional view illustrating an example of a vehicle direction indicator light in the related art.

For example, as shown in FIG. 10, the direction indicator light may be applied to a rear turn signal light 60 provided with a light emitting body 65 that includes an inner lens 61 formed in a three-dimensional shape having a three-dimensional characteristic that the inner lens 61 is formed to extend toward the rear side B of the vehicle and covers a part of brace lights 70 from the upper side and from the outside (right side) of the vehicle.

In this case, the inner lens 61 is formed integrally by an upper lens portion 61A of a pent roof shape that is disposed above the brake lights 70 and covers a part of the brake lights 70 from the upper side, a side lens portion 61B of a pent roof shape that is connected to an outer end part of the upper lens portion 61A in the vehicle width direction L1, is disposed on the right side of the brake lights 70 and covers the brake lights 70 from the outside (right side) of the vehicle, and a lower lens portion 61C of a pent roof shape that is connected to a lower end part of the side lens portion 61B, is disposed under the brake lights 70 and covers a part of the brake lights 70 from the lower side of the vehicle.

Further, the side lens portion 61B is formed in a "V" shape in a cross-sectional view by an outer surface lens portion (outer emitting surface) 62 that is formed in a step shape by a first surface portion 62a and a second surface portion 62b, an inner surface lens portion (inner emitting surface) 63 and a tip portion (tip surface) 64.

In the rear turn signal light 60 having such a configuration, it is similarly possible to achieve the same effects as in the above-described turn signal light 13.

That is, it is possible to sufficiently secure the light distribution toward the rear side B of the vehicle, to emit light in the light emission range between 80 degrees on the outside and 45 degrees on the inside, and to secure excellent visibility from a lateral side.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle direction indicator light comprising:
  a light source; and
  a light emitting body that is disposed on an outside of a vehicle with reference to the light source and guides light from the light source to be emitted to the outside of the vehicle,
  wherein the light emitting body includes: an outer emitting surface that extends in a longitudinal direction of the vehicle and faces the outside of the vehicle; an inner emitting surface that extends in the longitudinal direction of the vehicle and faces an inside of the vehicle; a tip surface that faces a front side or a rear side of the vehicle and connects the outer emitting surface and the inner emitting surface; and a light guide body that guides the light from the light source toward the inner emitting surface, and emits the light from the light source to the outside through the inner emitting surface, wherein the outer emitting surface is formed in a step shape in which a first surface portion that faces the outside of the vehicle and a second surface portion that faces the front side or the rear side of the vehicle are alternatingly connected to each other in the longitudinal direction of the vehicle, wherein the light from the light source is emitted to the outside through the first surface portion, and is also emitted to the outside through the second surface portion and the tip surface with an intensity higher than that of the light emitted through the first surface portion, wherein the light emitting body includes an inner lens, and the light guide body that guides the light from the light source toward the inner lens, wherein the inner lens is a multi-surface lens including the outer emitting surface, the inner emitting surface and the tip surface, and wherein the light guide body is provided between the inner lens and the light source.

2. The vehicle direction indicator light according to claim 1,
wherein the light emitting body guides the light from the light source to the inner emitting surface, and emits the light to the outside through the inner emitting surface.

3. The vehicle direction indicator light according to claim 2,
wherein the light emitting body emits the light from the light source through the inner emitting surface so that the intensity of the light is alternatingly varied in the longitudinal direction of the vehicle.

4. The vehicle direction indicator light according to claim 1,
wherein a part of light incident onto the second surface portion in the inner lens, among the light from the light source, is incident into the first surface portion and is emitted to the outside while being repeatedly reflected inside the first surface portion.

5. The vehicle direction indicator light according to claim 1,
wherein a width of the second surface portion and a width of the tip surface in a width direction of the vehicle are smaller than a length of the first surface portion in the longitudinal direction of the vehicle.

6. The vehicle direction indicator light according to claim 1,
wherein the light guide body is a reflector configured to reflect the light from the light source to the inner lens.

7. The vehicle direction indicator light according to claim 1,
wherein the light guide body is a light guide path configured to guide the light from the light source to the inner lens.

* * * * *